(12) United States Patent
Lee et al.

(10) Patent No.: US 8,536,732 B2
(45) Date of Patent: Sep. 17, 2013

(54) POWER SUPPLY SYSTEM

(75) Inventors: Chi-Hsiung Lee, Taoyuan County (TW); Chih-Chang Chang, Taoyuan County (TW); Ta-Chang Wei, Taoyuan County (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 417 days.

(21) Appl. No.: 12/906,129

(22) Filed: Oct. 17, 2010

(65) Prior Publication Data
US 2012/0049624 A1    Mar. 1, 2012

(30) Foreign Application Priority Data

Aug. 25, 2010   (CN) .......................... 2010 2 0504831

(51) Int. Cl.
*H02J 3/14*    (2006.01)
*H05B 37/02*   (2006.01)

(52) U.S. Cl.
USPC ............................................ 307/31; 315/294

(58) Field of Classification Search
None
See application file for complete search history.

(56) References Cited

U.S. PATENT DOCUMENTS

| | | | |
|---|---|---|---|
| 4,939,486 A * | 7/1990 | Bergdahl et al. | 333/175 |
| 2008/0088255 A1 * | 4/2008 | Wang et al. | 315/274 |
| 2010/0270945 A1 * | 10/2010 | Chang et al. | 315/294 |

* cited by examiner

*Primary Examiner* — Jared Fureman
*Assistant Examiner* — Aqeel Bukhari
(74) *Attorney, Agent, or Firm* — Altis Law Group, Inc.

(57) ABSTRACT

A power supply system drives a plurality of loads, and includes a power stage circuit, a pulse width modulation controller, a first isolation transformer, at least two second transformers, and at least two rectifier circuits. The power supply system converts external power signals into first alternating current (AC) power signals, and converts the first AC power signals into second AC power signals. The second transformers either boost or buck the second AC power signals, and each has a primary winding connected to a secondary winding of the first isolation transformer in parallel and a center tap grounded. Each of the rectifier circuits is connected to two ends of a secondary winding of a corresponding one of the second transformers, and rectifies the boosted or bucked second AC power signals to output direct current (DC) power signals to a corresponding one of the plurality of loads.

9 Claims, 2 Drawing Sheets

T2n, and rectifies the boosted or bucked second
AC power signals to output DC power signals to a corresponding one of the plurality of loads L21, L22, … L2n. In one embodiment, the rectifier circuit 121 is connected between the secondary winding of the second transformer T21 and the load L21, the rectifier circuit 122 is connected between the secondary winding of the second transformer T22 and the load L22, and the rectifier circuit 12n is connected between the secondary winding of the second transformer T2n and the load L2n.

Each one of the at least two rectifier circuits 121, 122, … 12n includes two diodes D1 and D2. Anodes of the diodes D1 and D2 of the at least two rectifier circuits 121, 122, … 12n are respectively connected to the two ends of the secondary winding of the corresponding one of the at least two second transformers T21, T22, … T2n, and cathodes of the diodes D1 and D2 of the at least two rectifier circuits 121, 122, … 12n are respectively connected together to output an DC power signal to the corresponding one of the plurality of loads L21, L22, … L2n. In an exemplary embodiment, the anodes of the diodes D1 and D2 of the rectifier circuit 121 are connected to the two ends of the secondary winding of the second transformer T21, and the cathodes of the diodes D1 and D2 of the rectifier circuit 121 are connected together to output one DC power signal to the load L21. The anodes of the diodes D1 and D2 of the rectifier circuit 122 are connected to the two ends of the secondary winding of the second transformer T22, and the cathodes of the diodes D1 and D2 of the rectifier circuit 122 are connected together to output another DC power signal to the load L22. The anodes of the diodes D1 and D2 of the rectifier circuit 12n are connected to the two ends of the secondary winding of the second transformer T2n, and the cathodes of the diodes D1 and D2 of the rectifier circuit 12n are connected together to output a further DC power signal to the load L2n. In one embodiment, the at least two rectifier circuits 121, 122, … 12n output different DC power signals.

In one embodiment, the power supply system 10 further includes a resonance circuit 130 connected between the power stage circuit 100 and the first isolation transformer T1. The resonance circuit 130 includes a first capacitor C1, a first inductor L1 and a second inductor L2. The first capacitor C1 is connected between the power stage circuit 100 and one end of the first inductor L1, and the second inductor L2 is connected between another end of the first inductor L1 and the ground and connected to the primary winding of the first isolation transformer T1 in parallel. In one embodiment, the second inductor L2 may be a leakage inductor of the first isolation transformer T1.

In one embodiment, the power supply system 10 further includes at least two second filter capacitor C2, respectively connected between one of the at least two rectifier circuits 121, 122, … 12n and the ground, particularly between an output of the one of at least two rectifier circuits 121, 122, … 12n and the ground.

FIG. 2 is a schematic diagram of a second embodiment of a power supply system 20 as disclosed. The power supply system 20 converts the external power signals Vin into DC power signals, to drive a plurality of loads L30, L31, … L3m (m being a integer and not less than 1). The plurality of loads L30, L31, … L3m includes LEDs and electronic circuits, which are driven by different DC power signals. In one embodiment, the external power signals Vin may be DC power signals. The power supply system 20 includes the power stage circuit 100, the PWM controller 110, the first isolation transformer T1, at least one second transformer T31, … T3m (m being a integer and not less than 1), at least
POWER SUPPLY SYSTEM

BACKGROUND

1. Technical Field

The disclosure relates to power supply systems and particularly to a power supply system with a plurality of outputs.

2. Description of Related Art

Resonance circuits, each of which includes a main inductor, a leakage inductor, and a capacitor, are usually used in power supply systems, and the leakage inductor and a transformer are usually integrated in one magnetic element. When a power supply system needs to provide a plurality of outputs, only one isolation transformer is utilized, with a plurality of windings attached to the isolation transformer or a plurality of direct current (DC) to DC converters attached to an output, to achieve the plurality of outputs. However, the power supply system including the isolation transformer with the plurality of windings or including the plurality of DC to DC converters has a large size, which enlarges the size of an electronic device.

DETAILED DESCRIPTION

Figure 1:
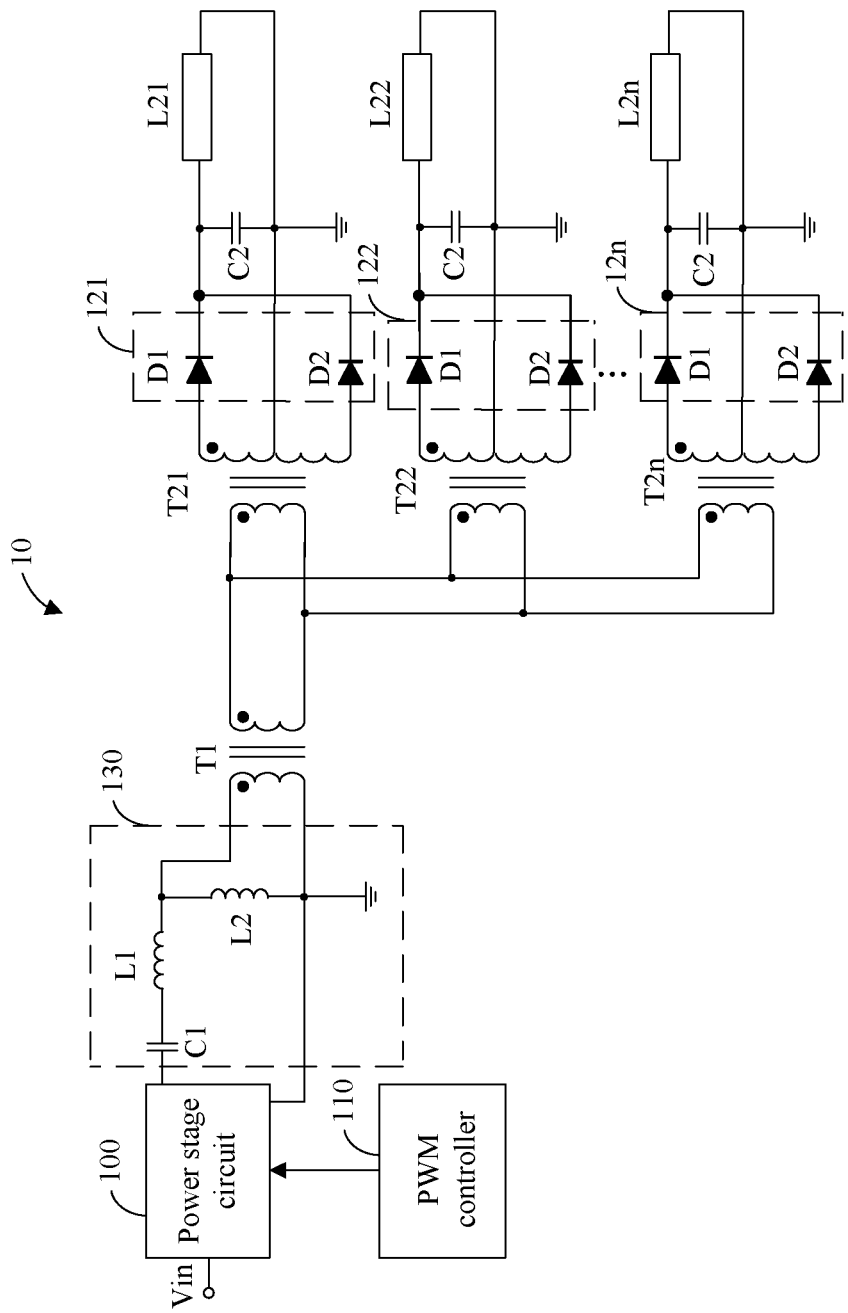
FIG. 1 is a schematic diagram of a first embodiment of a power supply system as disclosed.
Figure 2:
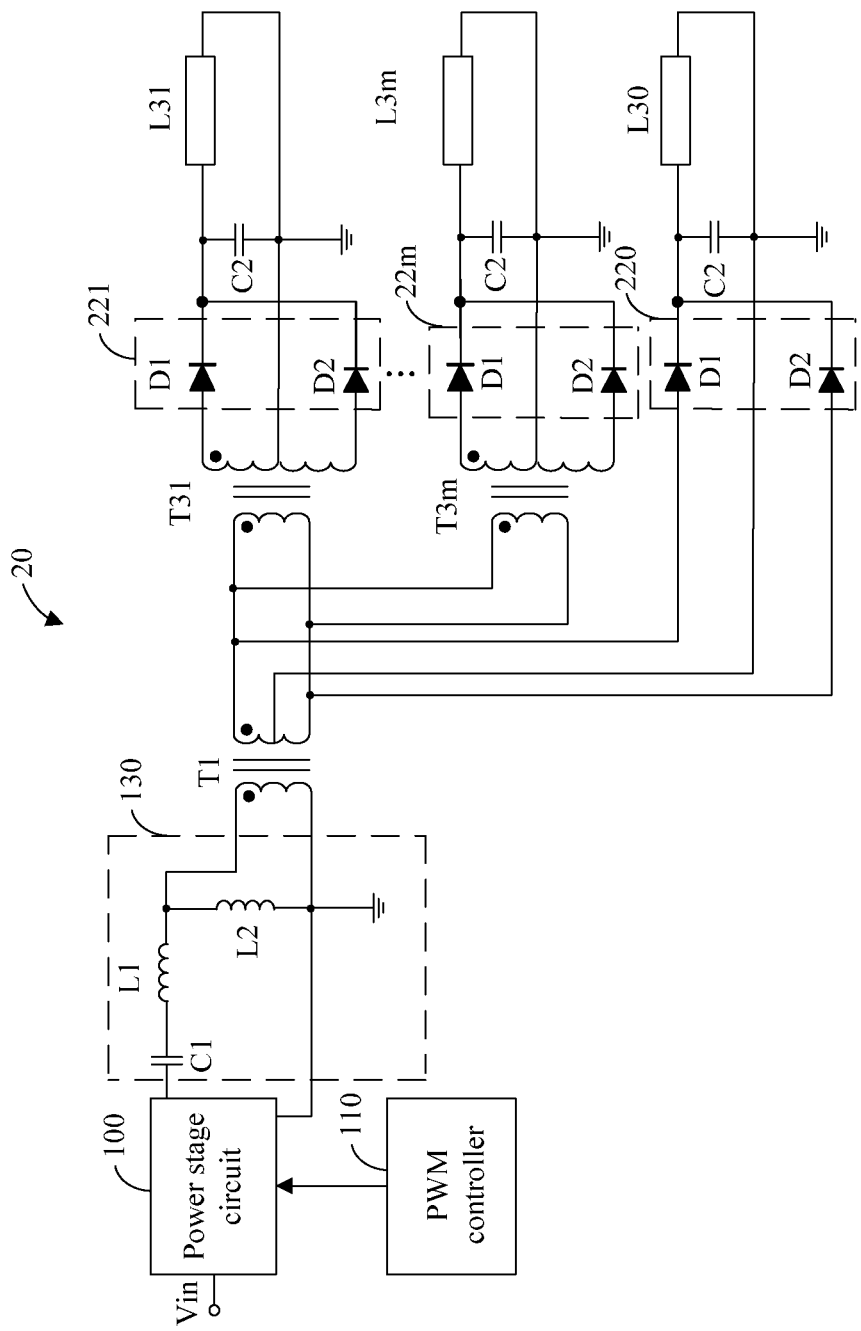
FIG. 2 is a schematic diagram of a second embodiment of a power supply system as disclosed.

FIG. 1 is a schematic diagram of a first embodiment of a power supply system 10 as disclosed. In one embodiment, the power supply system 10 converts external power signals Vin into direct current (DC) power signals, to drive a plurality of loads L21, L22, … L2n (n being a integer and not less than 2). The plurality of loads L21, L22, … L2n include light emitting diodes (LEDs) and electronic circuits, which are driven by different DC power signals. In one embodiment, the external power signals Vin may be DC power signals. The power supply system 10 includes a power stage circuit 100, a pulse width modulation (PWM) controller 110, a first isolation transformer T1, at least two second transformers T21, T22, … T2n (n being a integer and not less than 2), and at least two rectifier circuits 121, 122, … 12n.

The power stage circuit 100 converts the external power signals Vin into first alternating current (AC) power signals. In one embodiment, the power stage circuit 100 includes a half bridge circuit. The PWM controller 110 controls the power stage circuit 100. The first isolation transformer T1 converts the first AC power signals into second AC power signals and isolates a primary side and a secondary side. The first isolation transformer T1 includes a primary winding connected to the power stage circuit 100 and a secondary winding. In one embodiment, the second AC power signals may be square wave signals.

The at least two second transformers T21, T22, … T2n respectively either boost or buck the second AC power signals, and respectively include a primary winding and a secondary winding. The primary windings of the at least two second transformers T21, T22, … T2n are connected to the secondary winding of the first isolation transformer T1 in parallel, and center taps of the secondary windings of the at least two second transformers T21, T22, … T2n are grounded.

Each one of the at least two rectifier circuits 121, 122, … 12n is connected to two ends of the secondary winding of a one first rectifier circuit 221, . . . 22m, and a second rectifier circuit 220. The power stage circuit 100, the PWM controller 110, the first isolation transformer T1, and the at least one second transformer T31, . . . T3m have similar structures and connections to those of FIG. 1.

The at least one first rectifier circuit 221, . . . 22m is connected to two ends of a secondary winding of a corresponding one of the at least one second transformer T31, . . . T3m, and rectifies boosted or bucked second AC power signals to output first DC power signals to a corresponding one of the loads L31, . . . L3m.

The second rectifier circuit 220 is connected to the secondary winding of the first isolation transformer T1, and is in parallel with the at least one second transformer T31, . . . T3m. The second rectifier circuit 220 rectifies the second AC power signals to output second DC power signals to the load L30.

Each one of the at least one first rectifier circuit 221, . . . 22m and the second rectifier circuit 220 includes two diodes D1 and D2. Anodes of the diodes D1 and D2 of the at least one first rectifier circuit 221, . . . 22m are connected to the two ends of the secondary winding of the corresponding one of the at least one second transformer T31, . . . T3m, and cathodes of the diodes D1 and D2 of the at least one first rectifier circuit 221, . . . 22m are connected together to output a first DC power signal to the corresponding one of the plurality of loads L31, . . . L3m. In an exemplary embodiment, the anodes of the diodes D1 and D2 of the first rectifier circuit 221 are connected to the two ends of the secondary winding of the second transformer T31, and the cathodes of the diodes D1 and D2 of the first rectifier circuit 221 are connected together to output one first DC power signal to the load L31. The anodes of the diodes D1 and D2 of the first rectifier circuit 22m are connected to the two ends of the secondary winding of the second transformer T3m, and the cathodes of the diodes D1 and D2 of the first rectifier circuit 22m are connected together to output another first DC power signal to the load L3m. The anodes of the diodes D1 and D2 of the second rectifier circuit 220 are connected to two ends of the secondary winding of the first isolation transformer T1, and the cathodes of the diodes D1 and D2 of the second rectifier circuit 220 are connected together to output the second DC power signals to the load L30. In one embodiment, the at least one first rectifier circuit 221, . . . 22m and the second rectifier circuit 220 output different DC power signals.

In one embodiment, the power supply system 20 further includes a resonance circuit 130 connected between the power stage circuit 100 and the first isolation transformer T1. The resonance circuit 130 includes a first capacitor C1, a first inductor L1 and a second inductor L2. The first capacitor C1 is connected between the power stage circuit 100 and one end of the first inductor L1, and the second inductor L2 is connected between another end of the first inductor L1 and the ground and connected to the primary winding of the first isolation transformer T1 in parallel. In one embodiment, the second inductor L2 may be a leakage inductor of the first isolation transformer T1.

In one embodiment, the power supply system 20 further includes at least two second filter capacitor C2, respectively connected between the at least one first rectifier circuit 221, . . . 22m and the ground and between the second rectifier circuit 220 and the ground, particularly between an output of the at least one first rectifier circuit 221, . . . 22m and the ground and between an output of the second rectifier circuit 220 and the ground.

The power supply systems 10 and 20 utilize the first isolation transformer T1 to isolate the primary side and the secondary side and the second transformers with no isolation, thus the first isolation transformer T1 and the second transformers have high efficiency and are more tabular, which miniaturizes the power supply systems 10 and 20 and also electronic devices using the power supply systems 10 and 20. In addition, the second transformers with no isolation reduce costs. Furthermore, turn ratios of the second transformers can be adjusted to achieve different output voltage.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A power supply system, for driving a plurality of loads, comprising:
    a power stage circuit to convert external power signals into first alternating current (AC) power signals;
    a pulse width modulation controller to control the power stage circuit;
    a first isolation transformer to convert the first AC power signals into second AC power signals, the first isolation transformer comprising a primary winding connected to the power stage circuit and a secondary winding;
    a resonance circuit connected between the power stage circuit and the first isolation transformer, the resonance circuit comprising a first inductor, a first capacitor and a second inductor, wherein the first capacitor is electrically connected between the power stage circuit and a first terminal of the first inductor, wherein the second inductor is electrically connected between a second terminal of the first inductor and ground and is connected in parallel with the primary winding of the first isolation transformer;
    at least two second transformers to either boost or buck the second AC power signals, wherein each of the at least two second transformers comprises a primary winding and a secondary winding, the primary windings of the at least two second transformers are connected to the secondary winding of the first isolation transformer in parallel, and center taps of the secondary windings of the at least two second transformers are grounded; and
    at least two rectifier circuits, wherein each of the at least two rectifier circuits is connected to two ends of the secondary winding of a corresponding one of the at least two second transformers, to rectify the boosted or bucked second AC power signals to output direct current (DC) power signals to a corresponding one of the plurality of loads.

2. The power supply system of claim 1, wherein each of the at least two rectifier circuits comprises two diodes, anodes of the two diodes of the at least two rectifier circuits are respectively connected to the two ends of the secondary winding of the corresponding one of the at least two second transformer, and cathodes of the two diodes of the at least two rectifier circuits are respectively connected together to output an DC power signal to the corresponding one of the plurality of loads.

3. The power supply system of claim 2, further comprising at least two second filter capacitors respectively connected between a corresponding one of the at least two rectifier circuits and the grounded.

4. The power supply system of claim 3, wherein the at least two second filter capacitors are respectively connected between an output of the corresponding one of the at least two rectifier circuits and the ground.

5. A power supply system, for driving a plurality of loads, comprising:
 a power stage circuit to convert external power signals into first alternating current (AC) power signals;
 a pulse width modulation controller to control the power stage circuit;
 a first isolation transformer to convert the first AC power signals into second AC power signals, the first isolation transformer comprising a primary winding connected to the power stage circuit and a secondary winding;
 a resonance circuit connected between the power stage circuit and the first isolation transformer, the resonance circuit comprising a first inductor, a first capacitor and a second inductor, wherein the first capacitor is electrically connected between the power stage circuit and a first terminal of the first inductor, wherein the second inductor is electrically connected between a second terminal of the first inductor and ground and is connected in parallel with the primary winding of the first isolation transformer;
 at least one second transformer to either boost or buck the second AC power signals, wherein the at least one second transformer comprises a primary winding and a secondary winding, the primary winding of the at least one second transformer is connected to the secondary winding of the first isolation transformer, and a center tap of the secondary winding of the at least one second transformer is grounded;
 at least one first rectifier circuit connected to two ends of the secondary winding of the at least one second transformer, to rectify the boosted or bucked second AC power signals to output first direct current (DC) power signals to a corresponding one of the plurality of loads; and
 a second rectifier circuit connected to two ends of the secondary winding of the first isolation transformer and in parallel with the at least one second transformer, to rectify the second AC power signals to output second DC power signals to a corresponding one of the plurality of loads.

6. The power supply system of claim 5, wherein the at least one first rectifier circuit comprises two diodes, anodes of the two diodes of the at least one first rectifier circuit is connected to the two ends of the secondary winding of the at least one second transformer, and cathodes of the two diodes of the at least one first rectifier circuit is connected together to output the first DC power signal to the corresponding one of the plurality of loads.

7. The power supply system of claim 5, wherein the second rectifier circuit comprises two diodes, anodes of the two diodes of the second rectifier circuit is connected to the two ends of the secondary winding of the first isolation transformer, and cathodes of the two diodes of the second rectifier circuit is connected together to output the second DC power signals to the corresponding one of the plurality of loads.

8. The power supply system of claim 5, further comprising at least two second filter capacitors respectively connected between the at least one first rectifier circuit and the grounded and between the second rectifier circuit and the ground.

9. The power supply system of claim 8, wherein the at least two second filter capacitors are respectively connected between an output of the at least one first rectifier circuit and the ground and between an output of the second rectifier circuit and the ground.

* * * * *